United States Patent
Rolandi et al.

(10) Patent No.: US 11,667,770 B2
(45) Date of Patent: Jun. 6, 2023

(54) NATURALLY SOURCED CHITIN FOAM

(71) Applicant: The Regents of the University of California, Oakland, CA (US)

(72) Inventors: Marco Rolandi, Santa Cruz, CA (US); John Felts, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 1106 days.

(21) Appl. No.: 16/319,139

(22) PCT Filed: Jul. 20, 2017

(86) PCT No.: PCT/US2017/043078
§ 371 (c)(1),
(2) Date: Jan. 18, 2019

(87) PCT Pub. No.: WO2018/017837
PCT Pub. Date: Jan. 25, 2018

(65) Prior Publication Data
US 2020/0239670 A1 Jul. 30, 2020

Related U.S. Application Data

(60) Provisional application No. 62/441,852, filed on Jan. 3, 2017, provisional application No. 62/364,421, filed on Jul. 20, 2016.

(51) Int. Cl.
| | | |
|---|---|---|
| C08J 9/30 | (2006.01) | |
| C08L 5/08 | (2006.01) | |
| B63B 32/40 | (2020.01) | |

(52) U.S. Cl.
CPC ............ *C08L 5/08* (2013.01); *B63B 32/40* (2020.02); *C08J 9/30* (2013.01); *C08J 2201/026* (2013.01); *C08J 2205/052* (2013.01); *C08J 2205/10* (2013.01); *C08J 2207/00* (2013.01); *C08L 2201/06* (2013.01); *C08L 2203/14* (2013.01)

(58) Field of Classification Search
CPC .... C08L 5/08; C08L 2201/06; C08L 2203/14; B63B 32/40; B63B 32/57; B63B 32/59; C08J 9/30; C08J 2201/026; C08J 2205/052; C08J 2205/10; C08J 2207/00; C08J 2305/08; C08B 37/003
See application file for complete search history.

(56) References Cited

U.S. PATENT DOCUMENTS

| | | | |
|---|---|---|---|
| 5,011,864 A | 4/1991 | Nielsen | |
| 5,256,702 A | 10/1993 | Grigat | |
| 5,756,111 A | 5/1998 | Yoshikawa | |
| 5,851,461 A * | 12/1998 | Bakis | A61L 15/425 156/305 |
| 2003/0143388 A1 | 7/2003 | Reeves | |
| 2003/0155679 A1 | 8/2003 | Reeves | |
| 2012/0077012 A1 | 3/2012 | Liu | |
| 2015/0057368 A1 | 2/2015 | Connelly | |
| 2015/0299383 A1 | 10/2015 | Trumbo | |
| 2016/0168311 A1 | 6/2016 | Cuero Rengifo | |

FOREIGN PATENT DOCUMENTS

| | | |
|---|---|---|
| KR | 960004436 | 6/1993 |
| WO | WO2012030805 | 3/2012 |
| WO | WO2013131079 | 9/2013 |

OTHER PUBLICATIONS

Shigemessa et al. Evaluation of different absorbance ratios from infrared spectroscipy for analyzing the degree of deacetylation in chitin. Int. J. Biol. Macromolecules 18, 1996: 237-242.
Makarios-Laham et al. Biodegradability of Chitin- and Chitosan-Containing Films in Soil Enviroment. J. Environm. Polymer Degradation 3(1) 1995: 31-36.
Hu et al Solubility and property of chitin in NaOH/urea.
Hu et al Solubility and property of chitin in NaOH/urea aqueous solution. Carbhydr. Polym. 2007(70):451-458.
Rolandi, Self-assembled chitin nanofibers and applications. Adv Colloid Interface Sci 2014, 207, 216-22.

* cited by examiner

*Primary Examiner* — Irina S Zemel
(74) *Attorney, Agent, or Firm* — Lumen Patent Firm

(57) ABSTRACT

Closed cell chitin foam is provided. The closed-cell chitin foam composition does not absorb water, is biodegradable, and is mechanically characterized by a density range of 16 to 800 kg/m3, closed-cell pore sizes ranging from 50 microns to 1 mm, an elastic modulus of 3 to 175 MPa, and a tensile strength of 0.15 to 6.5 MPa. The chitin is at least 70% acetylated. In one aspect, the foam is enclosed in a shell e.g. in the form of a surfboard. Chitin foam according to this invention is fully biodegradable. The chitin foam overcomes the current problems with foams that contain polyurethane and polystyrene, and which are manufactured from petroleum-based sources. Petroleum based foams are not renewable, have an adverse impact on our environment, and pose significant health hazards to those who manufacture them. The chitin foam with its water-based manufacturing process and naturally sourced chitin, solves these problems.

16 Claims, 2 Drawing Sheets

NATURALLY SOURCED CHITIN FOAM

CROSS-REFERENCE TO RELATED APPLICATIONS

This application is a 371 of PCT/US2017/043078 filed Jul. 20, 2017. PCT application PCT/US2017/043078 claims the benefit of U.S. Provisional application 62/364421 filed Jul. 20, 2016. PCT application PCT/US2017/043078 also claims the benefit of U.S. Provisional application 62/441852 filed Jan. 3, 2017.

FIELD OF THE INVENTION

This invention relates to closed-cell dry foam created from naturally sourced chitin and methods of making the foam. This invention further relates to a surfboard constructed using chitin foam as the blank foam core.

BACKGROUND OF THE INVENTION

Currently the most widely produced foam, polyurethane and polystyrene, are created from nonrenewable petroleum based sources. Manufacturing and working with petroleum-based foams is very toxic and damaging to the environment. The present invention solves both of these problems by providing non-toxic and biodegradable foam.

SUMMARY OF THE INVENTION

The present invention pertains to a closed-cell dry foam made from naturally sourced chitin and methods of making the foam. This invention further pertains to a device, such as a floatation device or surfboard, constructed using chitin foam as the blank foam core.

Chitin foam according to this invention is a closed cell foam with pores that are sealed (e.g. not in contact with each other) so that the foam does not soak up water. In other words, the foam is not water absorbable. Foam according to this invention includes foam that has chitin as a primary component is chitin and does not have other polymers (organic, biological, or inorganic) that make up the structural part of the foam. Salts and surfactant traces may be present as part of the processing but do not provide structural characteristics to the foam. Foam according to this invention is fully biodegradable.

In one aspect of the invention, a foam is provided that comprises chitin. The chitin is provided as a closed-cell foam composition that does not absorb water, is biodegradable, and has a density range of 16 to 800 kg/m3, with closed-cell pore sizes ranging from 50 microns to 1 mm, an elastic modulus of 3 to 175 MPa, and a tensile strength of 0.15 to 6.5 MPa. The chitin is at least 70% acetylated. Acetylation is the ratio between the acutely groups and the sum of the acetyl groups and the primary amines on the chitin molecules. Acetylation of 50% or less results in the formation of chitosan, which is water soluble and present in most preparation. The chitin could comprise a crystalline alpha chitin, a crystalline beta chitin, an amorphous chitin, or a combination thereof. The foam is fully biodegradable.

In another aspect of the invention, a foam is provided that consists essentially of chitin. The chitin is provided as a closed-cell foam composition that does not absorb water, is biodegradable, and has a density range of 16 to 800 kg/m3, with closed-cell pore sizes ranging from 50 microns to 1 mm, an elastic modulus of 3 to 175 MPa, and a tensile strength of 0.15 to 6.5 MPa. The chitin is at least 70% acetylated. The chitin could comprise a crystalline alpha chitin, a crystalline beta chitin, an amorphous chitin, or a combination thereof. The foam is fully biodegradable.

In yet another aspect of the invention a flotation device (e.g. a surfboard) is provided that has a shell encasing a closed-cell chitin foam composition. The shell can be a fiberglass shell, a polyester shell, an epoxy resin shell, a bio-based resin, or any other shell appropriate for the purpose. The closed-cell chitin foam composition does not absorb water, is biodegradable, and has a density range of 16 to 800 kg/m3, with closed-cell pore sizes ranging from 50 microns to 1 mm, an elastic modulus of 3 to 175 MPa, and a tensile strength of 0.15 to 6.5 MPa. The chitin could comprise a crystalline alpha chitin, a crystalline beta chitin, an amorphous chitin, or a combination thereof. The foam is fully biodegradable. In a preferred embodiment of this aspect of the invention, the closed-cell chitin foam composition consists essentially of closed-cell chitin. In another preferred embodiment of this aspect of the invention the closed-cell chitin foam composition is fully biodegradable.

The majority of foams widely used today, contain polyurethane and polystyrene, and are manufactured from petroleum-based sources. Petroleum based foams are not renewable or sustainable, and additionally have an adverse impact on our environment, and pose significant health hazards to those who manufacture them.

Foam according to this invention is created using a water-based manufacturing process and naturally sourced chitin, and solves all of these problems. Every year 6 to 8 million tons of waste crab, squid, shrimp and lobster shells are produced globally. These materials are an abundant and cheap renewable source of chitin. Because the foam is made from chitin and other natural materials it does not have an adverse impact on the environment. Also, the manufacturing processes does not involve toxic chemicals or does not pose any significant health hazards during or after production. Chitin has very robust mechanical properties and is the structural component of the exoskeleton of arthropods. These can be translated into the foam as described in this invention allowing it to exhibit superior mechanical properties when compared to standard polyurethane or polystyrene foams.

DETAILED DESCRIPTION

Figure 1:
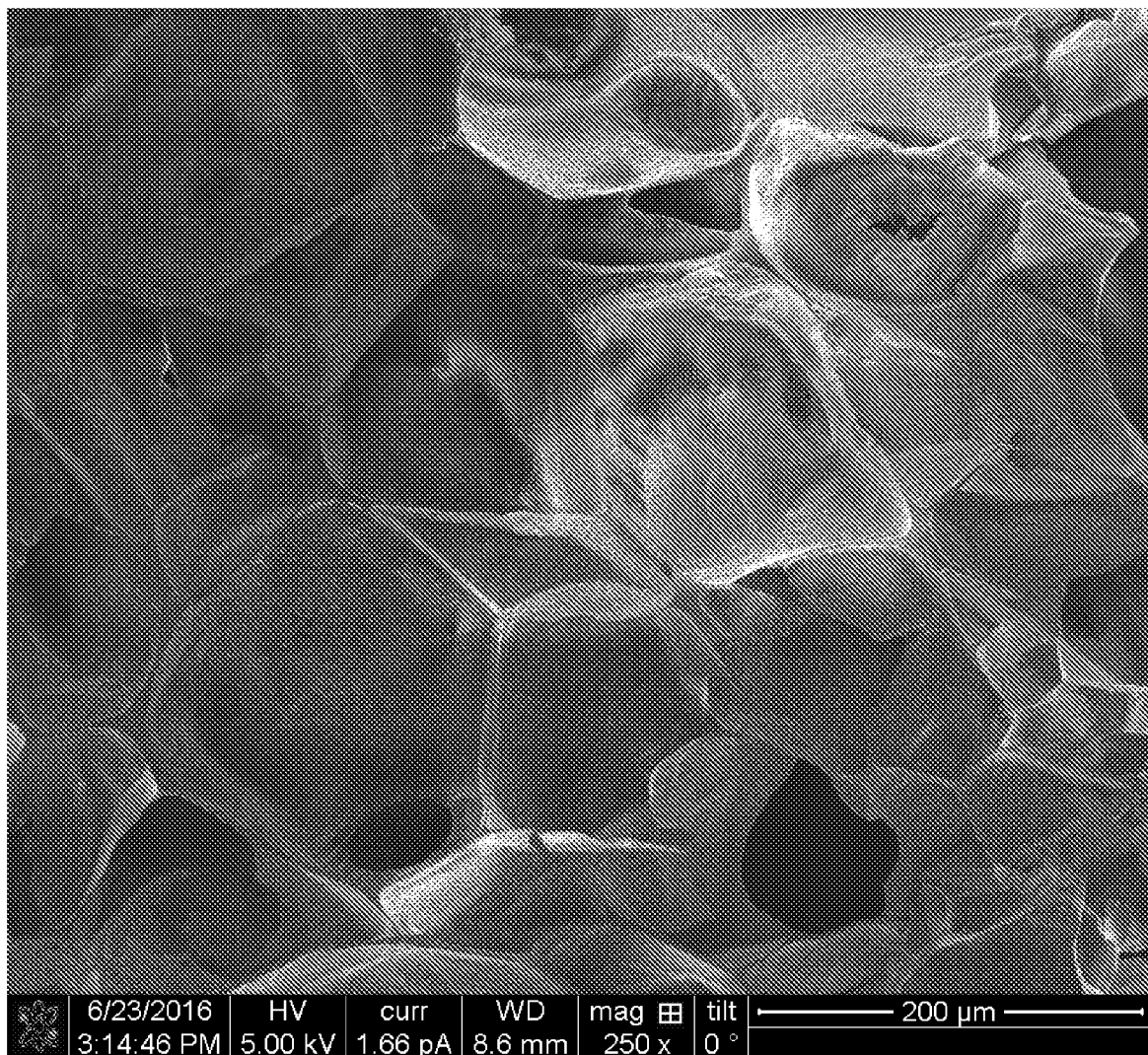
FIG. 1 shows according to an exemplary embodiment of the invention a Scanning Electron Microscope (SEM) image of a dried chitin foam cross section.

Embodiments of this invention pertain to closed-cell foam created using a water-based manufacturing process and chitin extracted from natural sources, including but not limited to, shellfish waste, arthropods, insects, cephalopods, and fungi.

Chitin is the second most abundant polysaccharide after cellulose and acts as the structural component of the exoskeleton of arthropods. It has mechanical properties that can be harnessed and exploited. The foam according to embodiments of this invention is not petroleum, so it does not have an adverse impact on the environment and does not pose any health hazards during the manufacturing or end-use of the product.

Once extracted from e.g. shellfish waste chitin can be a powder, flake, granule, or combination. The chitin is dissolved in an eco-friendly, water-based ionic liquid solution, including but not limited to a sodium hydroxide and urea solution. After dissolution the chitin is foamed either by mechanical, chemical, or physical blowing of the solution to create a chitin foamed state. Surfactants, stabilizers, and/or cross-linking agents may be added to the dissolved chitin solution to facilitate the foaming process, stabilize the foamed product, and/or tailor the mechanical properties of the dried foam. The surfactants can be anionic, cationic, or nonionic. These surfactants, stabilizers, and cross-linkers may include, but are not limited to, sodium dodecyl sulfate, ammonium lauryl sulfate, sodium stearate, polysorbate 20/40/60, dodecyldimethylamine oxide, glycols, ethers, sulfates, carboxylates, xanthan gum, or glyoxal.

The foamed chitin solution is then washed with either water, or an organic solvent (e.g. ethyl alcohol), to allow the chitin to assemble while simultaneously removing excess salt from the ionic solution. The foamed chitin solution is then dried by a method including but not limited to air, oven, steam, vacuum, or pressure to result in a cellular, closed-cell, chitin polymer foam material. This cellular structure is found to be very similar to that of standard polyurethane. The individual pore sizes of the dried chitin foam can range from 50 micrometers to 500 or a 1000 micrometers depending on amount of chitin and additives used, as well as the processing method. Beta chitin, when used, will transform into the polymeric form, alpha, during the assembly process. This change in crystallinity is exhibited in the final dried foam confirmed by X-ray diffraction analysis.

Polymorphic Forms of Chitin

Chitin exists in different polymorphic forms, which can be reduced to two forms: α and β. Alpha chitin is chitin with a crystalline structure having antiparallel chains. Beta chitin is chitin with a crystalline structure having parallel chains. In both forms, hydrogen bonds between hydroxyls join longitudinally the linear polysaccharide chains to form sheets. In α-chitin the polysaccharide chains are antiparallel, and in β-chitin the polysaccharide chains are parallel. Partial N-deacetylation of chitin produces chitosan, which is the most commonly used derivative of chitin. The degree of acetylation (DA), i.e. the proportion of acetylated units (m) with respect to the total number of acetylated and deacetylated units (m+n), characterizes chitosan chemical properties. Chitosan has a typical DA of less than 0.35 and it is a copolymer composed of 2-acetamido-2-deoxy-β-D-glucopyranose and 2-amino-2-deoxy-D-glucopyranose- or D-glucosamine (GlcN). The presence of amino groups renders chitosan soluble in acidic solutions with pH<6.5 upon protonation of the primary amines. Highly deacetylated chitosan (low DA) does not assemble into nanofibers from solution; the nanofiber assembly process is driven by the intramolecular hydrogen bonding of the acetyl groups.

Overview

The ability to solubilize both beta and alpha polymeric forms of chitin in a water-based solution has been demonstrated. The resulting product is a viscose, yellowish gel. The water-based solution is comprised of mainly water, salts (typically sodium hydroxide [NaOH] or potassium hydroxide [KOH]) and urea. The ability to successfully solubilize both beta or alpha chitin with weight percent ranging from 2 to 10 weight percent has been demonstrated. NaOH or KOH concentrations between 6 and 20%, and the urea concentration between 2 and 14% were found to completely dissolve the chitin, the Naturally, as the chitin weight percent goes up the viscosity of the solution increases. Therefore, viscosity of the solution can be altered by increasing the salt and urea concentrations accordingly.

After creating the solubilized chitin gel, the next step is to foam the solution to create a cellular structure material. This is achieved by adding a foaming agent that facilitates the introduction of air into the gel to create a chitin gel foam. Mechanical agitation can be combined with different foaming agents and techniques. Such surfactants include polysorbate 20 (T20), sodium dodecyl sulfate, and those found in commercially available dish soap. In some examples, optimal foaming results from a chitin concentration ranging from 2 to 6 weight percent, and a salt (NaOH/KOH) concentration ranging from 8 to 12 weight percent.

In some examples T20 (Tween-20) with a weight percent to solution ranging from 0.01% to 0.1% is used. The process of foaming begins using a solubilized chitin gel at temperature of between 0 and 10 degrees Celsius. The foaming agent is then added to the solution of solubilized chitin and mechanically agitated. Mechanical agitation can be performed for at least 1 to 10 minutes depending on the temperature of the sample and the degree of foaming achieved. A longer agitation time results in greater air incorporation and smaller pore sizes. It is important to keep the temperature below 10 degrees Celsius while foaming otherwise the chitin will begin to assemble and harden prematurely as the hydrogen bonding increases.

After mechanical agitation and creation of a stable, cellular chitin foam, then the foam is allowed to set. That is, the chitin foam is allowed to completely solidify as the hydrogen bonding increases throughout the solution. Setting can be performed at room temperature or, alternatively, the foamed chitin solution can be put into an oven to speed up the solidification of the chitin into a hardened foam structure. The setting can be performed at any temperature between 25 degrees Celsius and 95 degrees Celsius or greater than 95 degrees. At lower temperatures, the solidification of the chitin foam can take hours (also depending on the size of the foamed chitin solution). At higher temperatures, the solidification of the chitin foam can occur in as little as 15 minutes.

After the chitin foam solution has been solidified, it is washed with water (e.g. distilled water), an organic solvent (e.g. ethanol), or a combination of both (e.g. 50%/50% water/ethanol) to remove the salt and urea from the finished solidified foam. The washing process can take a day or more depending on the volume of the solidified chitin foam and/or the original concentration of salt (NaOH/KOH) used in making the initial chitin solution preparation. The washing process can be monitored by measuring the pH levels of the water. If pH of the wash water rises above 11.0, it is neutralized and replaced with fresh wash water. The washing is continued until the water used to wash out the solidified chitin foam has a stable pH below 8.5, indicating that a sufficient amount of salts and other excess additives (urea, surfactants) have been removed. This has been shown by XRD and FTIR analysis.

When drying the foam using an oven a drying sequence is used. The drying sequence starts off at a higher temperature to remove most of the excess water from the solidified chitin foam. Over time, as the water content of the foam is reduced from heating, the temperature also should decrease accordingly to ensure the outer shell of the chitin foam does not dry more rapidly than the center. As a result, such drying sequences start at a temperature ranging between 80 to 120 degrees Celsius. Once the excess water has been dried from the chitin foam, the sequence drops the temperature to a range of 60 degrees Celsius to 90 degrees Celsius (depending on the starting temperature) until the first signs of shrinking start to occur and the majority of water has been removed from the chitin foam sample. At this point the oven temperature is further dropped to a range of 40 degrees Celsius to 60 degrees Celsius (depending on the starting temperature) and kept there until the chitin foam has completely dried.

The drying results in a strong closed-cell structured chitin foam. The final structure can be made into any shape including round, square, thick, thin, etc. The cell structure is a closed-cell where the pores of the foam are not connected to each other, and is very similar to that of polyurethane.

The foam according to the examples described herein can be characterized as a closed-cell foam consisting essentially of chitin, which is fully biodegradable, does not absorb water and has the following mechanical properties:

Range of Density: 16 to 800 kg/m3.
Range of pore sizes: 50 microns to 1 mm.
Range of elastic modulus: 3 MPa to 175 MPa.
Range of tensile strength: 0.15 MPa to 6.5 MPa.
The chitin at least 70% acetylated.

In an alternate embodiment, the foam according to the examples described herein can be characterized as a closed-cell foam consisting essentially of chitin, which is fully biodegradable, does not absorb water and has the following mechanical properties:

Range of Density: 10 to 900 kg/m3.
Range of pore sizes: 5 microns to 1 mm.
Range of elastic modulus: 1 MPa to 1 GPa.
Range of tensile strength: 0.1 MPa to 50 MPa.
The chitin at least 70% acetylated.

Example 1

A first embodiment is a closed pore foam that is made essentially of chitin. Using chitin that crystallizes into the alpha form after the processing does not need the use of a cross linker to yield a closed cell-rigid foam.

The foam does not absorb water and it is not wettable. This is obtained by using chitin with >90% degree of acetylation. The >90% degree of acetylation makes the chitin challenging to dissolve to make the foam, but yields assembly of chitin into crystalline alpha chitin. Alpha chitin is not soluble in water, does not absorb water, and the increased hydrogen bonding in alpha chitin yields to better mechanical properties compared to composite foams, or foams made of chitosan.

By exploiting the assembly of chitin, mechanical agitation is sufficient to trap the gas bubbles in the foam, which solidifies when water evaporates giving yield to a solid structure. This technique creates a foam consisting essentially of chitin by dissolving chitin in water, providing foaming and gelation through mechanical agitation and evaporating the water. This foam has superior mechanical properties relative to composite foams due to the alpha chitin packing.

Although the foam's major component is chitin and the fact that is does not require the addition of other polymers and or blowing agents, it could accommodate the addition of such other polymers and blowing agents if desired (i.e. the foam consists essentially of chitin). The chitin assembles into a rigid structural foam because most of the molecules arrange themselves into alpha chitin crystalline structure that involves a high degree of hydrogen bonding. Foams predominantly made up of components other than chitin or chitosan (w/o acetyl groups) will not assemble in such manner. Additionally, the high degree of hydrogen bonding results in a very rigid foam with a high elastic modulus.

Example 2

This is but one example of producing chitin foam according to the invention. A solution of 8% by weight sodium hydroxide (NaOH) and 4% by weight urea are dissolved in deionized water. After dissolving the NaOH and urea, the solution is cooled to around 5 degrees Celsius. The NaOH/urea solution is removed from cooling and 2% by weight beta chitin is added. The chitin is stirred into the solution and is then incubated at −20 degrees Celsius for 24 to 48 hours. Over the 24 to 48 hours the NaOH/urea/chitin solution is removed and allowed to thaw to a temperature of 0-5 degrees Celsius, at which point the mixture forms a viscous gel. The gel is stirred again incubated at −20 degrees Celsius. After one, two or more cycles of the freeze/thaw/stir cycles described above, the solution is again allowed to thaw to around 0-5 degrees Celsius. A surfactant, stabilizer, and/or cross-linker is added to the solution. In some examples, the amount of surfactant added can be between 0.02% by weight to 1% by weight of the solution. The NaOH/urea/chitin gel with surfactant is mechanically foamed until a consistent liquid foamed state is achieved. The foam is then washed with water until all the excess NaOH and urea is removed and which is indicated by the pH of the solution being measured at around 7 (e.g. 6.5-7.5, 6.8-7.2, 6.9-7.1, or some other appropriate range). The foam is then transferred to a drying container such as a drying bed and allowed to air-dry. In an example, the foam can be dried in an oven. The resulting product a closed-cell dried chitin foam with an average pore size around 150 micrometers (FIG. 1) (such as 120 micrometers to 180 micrometers, 140 micrometers to 160 micrometers, 145 micrometers to 155 micrometers or some other appropriate range). The dried foam product exhibits crystallinity consistent with the alpha polymeric form of chitin. The beta chitin starting material transitions into alpha chitin during the self-assembly manufacturing step confirmed using X-ray diffraction analysis.

Further Process, Mechanical, and Structural Details

The foamed chitin can be tailored to have a variety of different mechanical and physical properties dependent on the desired application.

Foam manufactured with a 2 percent beta chitin by weight composition resulted in densities ranging from 80 to 200 kg/m$^3$ dependent on the different types and amounts of additives used (surfactant, stabilizer, cross-linking agent) and the washing and drying methods. Polyurethane density typically ranges from 16 to 64 kg/m$^3$. Foam with 2 weight percent beta exhibited compression elastic modulus' ranging from 3 to 8 MPa and yield strengths ranging from 0.2 to 0.46 MPa. These results match the mechanical properties of competing polyurethane foams, which have elastic modulus' ranging 5 to 7 MPa, and tensile strength around 0.35 MPa.

Foam made with 4 weight percent beta chitin resulted in densities ranging from 700 to 800 kg/m$^3$, compression elastic modulus' ranging from 100 to 175 MPa, and yield strengths ranging from 4.65 to 6.13 MPa. The major difference between the compression of polyurethane and polystyrene to that of Cruz Foam is the nature of the failure. Polyurethane and polystyrene both exhibit ductile failure, where Cruz Foam has more brittle failure characteristics.

Through experimentation we found that the degree of brittleness exhibited by the foam is dependent on the processing variables.

Foam with lower density indicated a combination of ductile and brittle failure profiles where Cruz Foam made with higher density showed complete brittle failure.

Using 8 wt % NaOH and 4 wt % urea water-based solution:

2 wt % beta chitin solution foamed using 0.06 wt % of polysorbate 20 and washed with 100% water, and was air dried. This process results in a dried foam with average pore size of 250 microns, a density of 147 kg/m3, elastic modulus of 7.01 MPa and tensile strength of 0.35 MPa.

Another sample made using the same process except with 0.04 wt % T20 results in pore size averaging 300 microns, density of 172 kg/m3, elastic modulus of 4.78 MPa and tensile strength 0.21 MPa.

4 wt % beta chitin foam made using 0.06 wt % T20 and washed with DI and air dried resulted sample with pore size average of 200 microns, density 690 kg/m3, elastic modulus 97 MPa and tensile strength 4.65 MPa.

Using a 9 wt % NaOH and 4 wt % urea solution:

3 wt % alpha chitin dissolved in this solution and foamed with 0.06 wt % T20, washed with 100% water and dried in the oven with a heat ramping of 90 C a 60 C a 40 C, ended with a density of 500 kg/m3, an average pore size of 300 microns, elastic modulus of 95.8 MPa, and tensile strength 5.61 MPa.

Surfboard/Flotation Device

Figure 2:
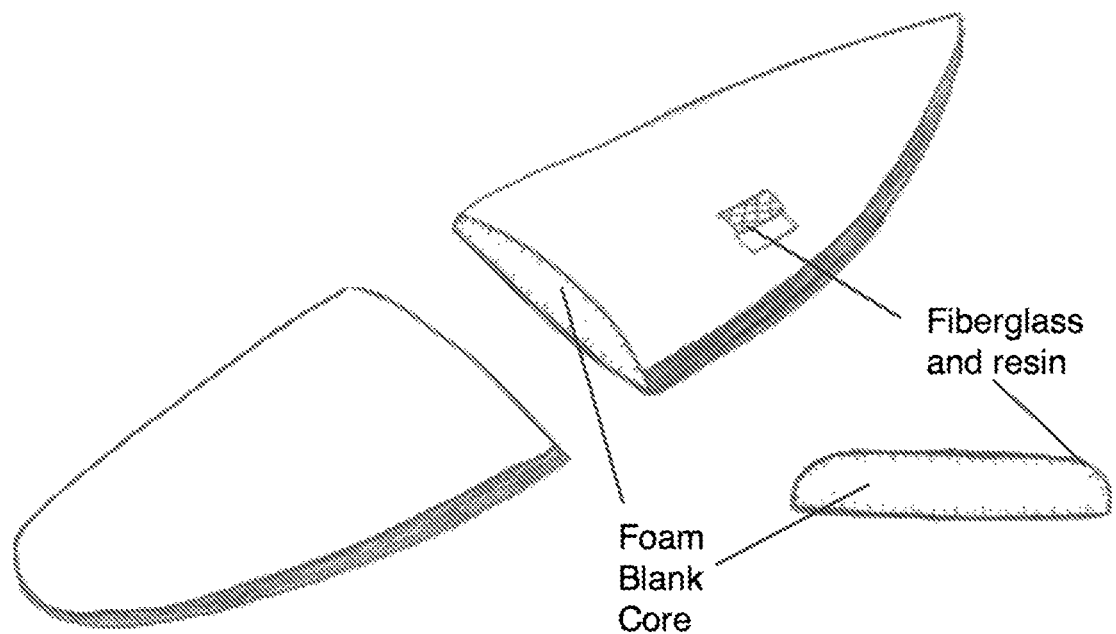
FIG. 2 shows according to an exemplary embodiment of the invention a surfboard or floatation device construction with a fiberglass and resin shell or encasing which encompasses or encloses the chitin foam.

In another embodiment, a device, such as a surfboard or a flotation device, is provided and defined as a shell with the herein described bio-based closed cell chitin foam as the blank foam core. Typically surfboards are constructed using rigid foam, usually polyurethane or polystyrene, as the blank foam core. Fiberglass and polyester or epoxy resins are then applied to the surface to get a finished surfboard shell. The standard construction of a surfboard (FIG. 2) includes a blank foam core that is blown using one of a variety of methods, and is then shaped by hand or machine into a desired dimension. The foam core acts as the primary mechanical and structural component in a surfboard by supplying strength, buoyancy, and flex.

The foam within the casing of the floatation device or surfboard according to the examples described supra can be characterized as a closed-cell foam consisting essentially of chitin, which is fully biodegradable, does not absorb water and has the following mechanical properties:

Range of Density: 10 to 900 kg/m3.
Range of pore sizes: 5 microns to 1 mm.
Range of elastic modulus: 1 MPa to 2 GPa.
Range of tensile strength: 0.1 MPa to 50 MPa.
Chitin at least 70% acetylated.

What is claimed is:

1. A foam, comprising of chitin, wherein the foam is a closed-cell foam not able to absorb water, is biodegradable, and the foam exhibits a density range from 16 to 800 kg/m3, closed-cell pore sizes ranging from 50 microns to 1 mm, an elastic modulus from 3 to 175 MPa, and a tensile strength from 0.15 to 6.5 MPa.

2. The foam as set forth in claim 1, wherein the chitin is at least 70% acetylated.

3. The foam as set forth in claim 1, wherein the chitin comprises a crystalline alpha chitin, a crystalline beta chitin, an amorphous chitin, or a combination thereof.

4. The foam as set forth in claim 1, wherein the foam consists essentially of chitin.

5. The foam as set forth in claim 1, wherein the foam is fully biodegradable.

6. A foam, consisting essentially of chitin, wherein the foam is a closed-cell foam not able to absorb water, is biodegradable, and the foam exhibits a density range from 16 to 800 kg/m3, closed-cell pore sizes ranging from 50 microns to 1 mm, an elastic modulus from 3 to 175 MPa, and a tensile strength from 0.15 to 6.5 MPa.

7. The foam as set forth in claim 6, wherein the chitin is at least 70% acetylated.

8. The foam as set forth in claim 6, wherein the chitin comprises a crystalline alpha chitin, a crystalline beta chitin, an amorphous chitin, or a combination thereof.

9. The foam as set forth in claim 6, wherein the foam is fully biodegradable.

10. A flotation device, comprising a shell encasing a closed-cell chitin foam.

11. The flotation device as set forth in claim 10, wherein the closed-cell foam does not absorb water, is biodegradable, and the foam exhibits a density range from 16 to 800 kg/m3, closed-cell pore sizes ranging from 50 microns to 1 mm, an elastic modulus from 3 to 175 MPa, and a tensile strength from 0.15 to 6.5 MPa.

12. The flotation device as set forth in claim 10, wherein the shell is a fiberglass shell, a polyester shell or an epoxy resin shell.

13. The flotation device as set forth in claim 10, wherein the flotation device is a surfboard.

14. The flotation device as set forth in claim 10, wherein the closed-cell foam consists essentially of chitin.

15. The flotation device as set forth in claim 10, wherein the closed-cell foam comprises a crystalline alpha chitin, a crystalline beta chitin, an amorphous chitin, or a combination thereof.

16. The flotation device as set forth in claim 14, wherein the chitin is at least 70% acetylated.

* * * * *